US008868344B2

(12) United States Patent
McKitterick

(10) Patent No.: US 8,868,344 B2
(45) Date of Patent: Oct. 21, 2014

(54) SYSTEMS AND METHODS FOR COMBINING A PRIORI DATA WITH SENSOR DATA

(75) Inventor: John B. McKitterick, Columbia, MD (US)

(73) Assignee: Honeywell International Inc., Morristown, NJ (US)

(*) Notice: Subject to any disclaimer, the term of this patent is extended or adjusted under 35 U.S.C. 154(b) by 44 days.

(21) Appl. No.: 13/240,957

(22) Filed: Sep. 22, 2011

(65) Prior Publication Data

US 2013/0080050 A1 Mar. 28, 2013

(51) Int. Cl.
G01C 21/00 (2006.01)
G01S 13/89 (2006.01)
G01S 7/40 (2006.01)

(52) U.S. Cl.
CPC .............. G01S 13/89 (2013.01); G01S 7/4004 (2013.01); G01C 21/005 (2013.01)
USPC .......................................... 701/534; 701/466

(58) Field of Classification Search
CPC ...... G01S 13/89; G01S 7/4004; G01C 21/005
USPC ..................... 701/466, 534, 448, 514; 342/54
See application file for complete search history.

(56) References Cited

U.S. PATENT DOCUMENTS

| 4,939,663 | A | * | 7/1990 | Baird ............................ 701/445 |
| 5,208,757 | A | * | 5/1993 | Appriou et al. ................. 701/23 |
| 6,218,980 | B1 | * | 4/2001 | Goebel et al. .................... 342/64 |
| 7,522,090 | B2 | * | 4/2009 | Hawkinson ..................... 342/64 |
| 8,121,399 | B2 | * | 2/2012 | Hayashi et al. ............... 382/154 |
| 8,244,455 | B2 | * | 8/2012 | Case et al. ..................... 701/123 |
| 2009/0238473 | A1 | * | 9/2009 | McKitterick ................. 382/228 |
| 2011/0137492 | A1 | | 6/2011 | Sahasrabudhe et al. |
| 2012/0150441 | A1 | * | 6/2012 | Ma et al. ....................... 701/510 |

OTHER PUBLICATIONS

Toth et al., "Recovery of Sensor Platform Trajectory from LiDAR Data Using Reference Surfaces", Proceedings of the 13th FIG Symposium and the 4th IAG Symposium, May 2008, pp. 1-10.*
Runnalls et al., "Terrain-Referenced Navigation Using the IGMAP Data Fusion Algorithm", Proceedings of the 61st Annual Meeting of the Institute of Navigation, Jun. 2005, pp. 976-987.*

* cited by examiner

Primary Examiner — John R Olszewski
Assistant Examiner — Todd Melton
(74) Attorney, Agent, or Firm — Shumaker & Sieffert, P.A.

(57) ABSTRACT

Systems and method for improving the presentation of sensed data (e.g., radar) by including a priori data. The a priori data is recast as if it were the output of a sensor. This allows the inclusion of the a priori data into an evidence grid that is combined with data from multiple types of sensors. Before the sensor data is combined into the evidence grid, the sensor data is aligned with the a priori data using an optimization algorithm. The optimization algorithm provides an optimum probability of a match between the sensor data and the a priori data by adjusting position or attitude associated with the sensor device. This removes any navigational errors associated with the sensor device data.

19 Claims, 2 Drawing Sheets

SYSTEMS AND METHODS FOR COMBINING A PRIORI DATA WITH SENSOR DATA

BACKGROUND OF THE INVENTION

The use of ranging sensors, such as radar or lidar, to provide real-time information about terrain and obstacles in front of a vehicle, such as a helicopter, is common, and much work has been done to improve the quality of the resultant three-dimensional maps. One approach is to use an evidence grid to accumulate the sensor data across both space and time. A probabilistic approach using an evidence grid was disclosed in U.S. patent application Ser. No. 12/051,801, filed Mar. 19, 2008, the contents of which are hereby incorporated by reference. However, the sensor data that is available from the on-board sensors is usually limited in its coverage by a restricted field of view, limited by obscurants such as dust, limited by shadowing, and often limited by simple lack of time on target. Consequently, the resultant three-dimensional maps have lower resolution than is desired and areas lacking in data.

Another solution is to use high-resolution a priori data of the target area that is based on sensor measurements taken previously from a different platform, e.g., a UAV. These data can have very high resolution (10 cm accuracy), and contain much information that would be beneficial if it were displayed to the pilot. However, these data cannot be used in place of the real-time sensor data for two reasons. First, the a priori data is old, and may not represent the current start of the target area. Buildings may have been erected (or removed), or vehicles that were present when the a priori data was taken may have been moved. Displaying the old, out-of-date a priori data without correcting for these temporal changes is dangerous. The second problem is that the navigation system of the helicopter has errors, so that the display of the a priori data may not correspond to the current position of the helicopter. This is particularly a problem when flying close to the ground, since the navigation error associated with the altitude is typically much larger than other navigation errors.

SUMMARY OF THE INVENTION

The present invention provides systems and method for improving the presentation of sensed data (e.g., radar) by including a priori data. The a priori data is recast as if it were the output of a virtual sensor. This allows the inclusion of the a priori data into an evidence grid that is combined with data from multiple types of sensors. Before the sensor data is combined into the evidence grid, the sensor data is aligned with the a priori data using an optimization algorithm.

In one aspect of the invention, the optimization algorithm provides an optimum probability of a match between the sensor data and the a priori data by adjusting the position or attitude associated with the sensor device. This removes any navigational errors associated with the sensor device data.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
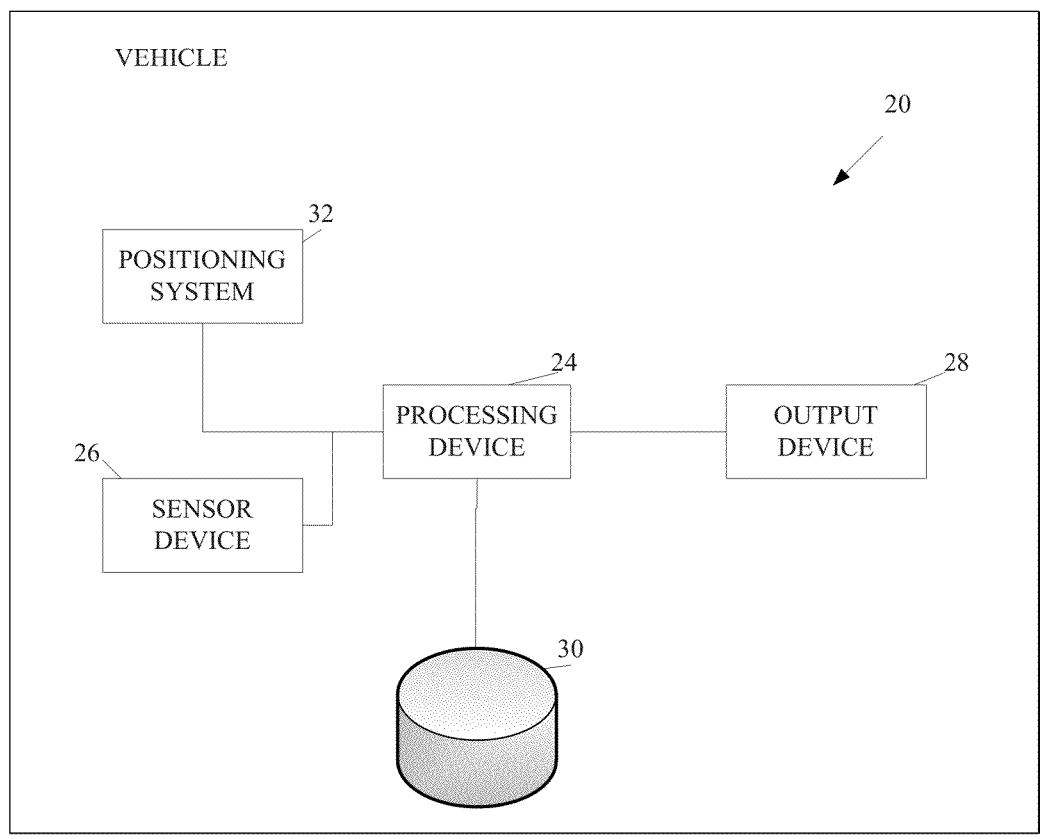
FIG. 1 is a block diagram of an exemplary system formed in accordance with an embodiment of the present invention.

FIG. 1 illustrates a system 20 that accurately combines real-time sensor data (e.g., radar, lidar, sonar) with a priori data (e.g., terrain, either exposed or submerged) to provide an accurate up-to-date image of the ground and obstacles for a vehicle. This is of particular benefit to a low flying aircraft, such as a helicopter. Other land-, sea-, or air-based vehicles may also benefit from the system 20.

The system 20 includes a processing device 24 that is in signal communication with a sensor device 26, such as a radar, lidar or combination thereof, and an output device 28, such as a display device, and a data storage device 30. The sensor device 26 is operable to transmit multiple simultaneous and/or sequential sensory (detection) signals. The output device 28 outputs (e.g., displays) a representation of the terrain and obstacles, as determined by the processing device 24, based on data from the sensor device 26 and a priori data from the data storage device 30. In one embodiment, the a priori data is terrain and obstacle data previously generated. An example of such a priori data is the terrain/obstacle database used in the Enhanced Ground Proximity Warning System (EGPWS) by Honeywell, Inc.

A priori data is a collection of elevation values at an array of locations. Associated with the a priori data is an uncertainty value that is based on the uncertainties associated with the original sensors and navigation system used to obtain the a priori data. The a priori data can be viewed as being the output of a virtual zero-beamwidth laser rangefinder located at a very high altitude and pointing straight down. Viewed in this way, the a priori data is considered the output from a (virtual) sensor and is put into an evidence grid (e.g., a three-dimensional grid with cells) together with real-time sensor data. Using the evidence grid(s), the processing device 24 resolves conflicts between the real-time sensor data and the a priori data by determining the most probable arrangement of occupied cells after the position and the attitude generated by a positioning system 32) associated with the real-time sensor data are adjusted.

The a priori data is prepopulated into the evidence grid, and then, assuming that the a priori data is correct, the probability $\beta$ that the real-time sensor measurements match the a priori data is calculated. This calculation follows the discussion below but with the a priori data placed in the various cells of the evidence grid, and with $\beta$ calculated as a function of the sensor position and attitude. The sensor position at the maximum of $\beta$ is the most likely position based on the real-time data, thus giving the optimum registration between the real-time sensor data and the a priori data. The calculation of the maximum of $\beta$ as a function of the navigation errors provides not only the corrections to the navigation, but also a covariance matrix describing the sensitivity of the corrections. The covariance matrix can be used to determine how trustworthy the corrections to the navigation data are, so that noisy data do not generate improper corrections.

Figure 2:
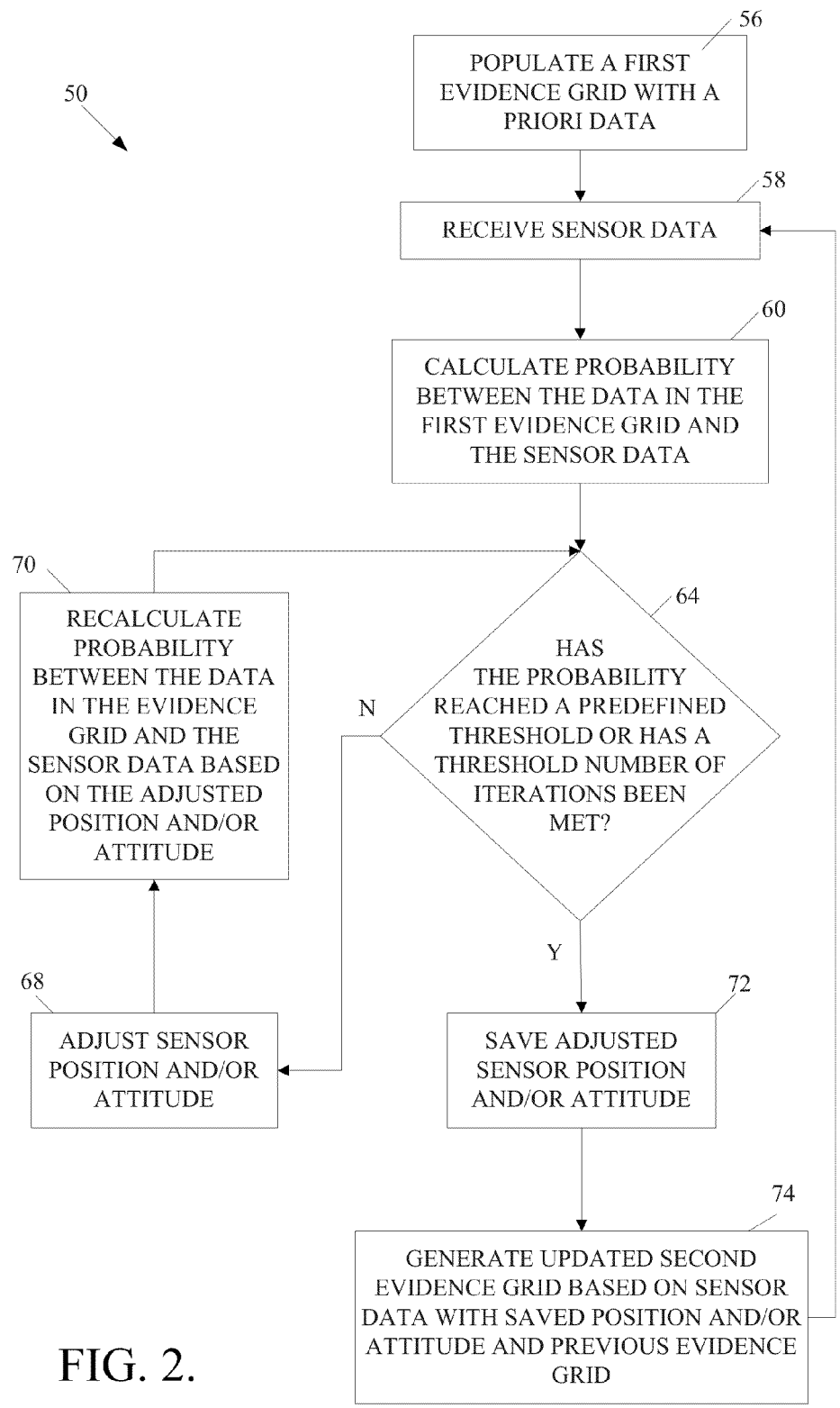
FIG. 2 is a flow diagram of an exemplary process performed by the system shown in FIG. 1.

As shown in FIG. 2, a process 50 performed by the processing device 24 combines the a priori data with other sensor data to generate an optimized understanding of the terrain and obstacles. First, at a block 56, a first evidence grid is populated with a priori data. The occupancies of the cells in the evidence grid are provided by the a priori data. Next, at a block 58, data from the sensor device 26 is attained and sent to the processing device 24. At a block 60, the probability that the a priori data in the evidence grid would reflect the radar (or lidar) in the same manner that the real world did reflect the real radar is calculated. This calculation is a function of the position and attitude of the sensor and the sensor data.

At a decision block 64, the processing device 24 determines if the calculated probability has reached a predefined threshold or a predefined number of iterations have occurred. In another embodiment, a first derivative of the probability with respect to position is less than a predefined threshold, indicating that the probability is at or near a local maximum as a function of position. If the condition of decision block 64 is not true, then at a block 68, the position and/or attitude of the sensor device 26 is adjusted and the process 50 returns to block 60 to perform the probability calculation based on the new position and/or attitude information.

If the condition of decision block 64 is true, then the calculated probability is determined to be maximized. An exemplary maximization process is performed by an optimization algorithm by applying an incremental change to the position and/or attitude values (i.e., pointing direction of the sensor device 26) and recalculating the probability based on the changed value(s). Blocks 64-70 are an example of an unspecified optimization scheme. Other optimization schemes may be used.

Then, at a block 72 the position and/or attitude of the sensor device 26 are corrected to values when the probability has been maximized. At a block 74, a second evidence grid is constructed using the a priori data, as if it had been generated by a virtual sensor, and data from the sensor device 26 using the corrected position. Since the a priori data includes the elevation of the terrain at given locations, with an associated uncertainty, the virtual sensor can be taken to be a lidar with zero-beamwidth at a very high elevation and a measurement uncertainty equal to that of the a priori data. Once the a priori data is considered to be the output of this virtual sensor, the combination of the a priori data with the real-time sensor data follows the description in U.S. patent application Ser. No. 12/051,801. Only the a priori data and the sensor data are used to generate the second evidence grid during the first pass through the process 50. Upon subsequent passes through the process 50, the previously updated second evidence grid is used at the step of block 74. The constructed second evidence grid is then used to generate an output, such as an image, for presentation on the output device 28.

The optimization steps performed at blocks 60-68 align or register the a priori data with the real-time sensor data. The step at block 74 determines if there are any changes between the a priori data and the current state of the scene as measured by the real-time sensor 26.

In one embodiment, if the sensor data (i.e., radar data) arrives at a rate of 10 Hz, the optimization steps (blocks 64-70) are performed once a second, and the step at block 74 is performed the other nine times a second. This saves considerable computational effort. Other update frequencies/strategies may be used.

The following describes an exemplary process performed at the step 74 shown in FIG. 2.

The evidence grid at its most basic is just a collection of points, and a measure of occupancy at each of these points. Typically, the collection of points forms a uniform grid in three-dimensions, but the uniformity is not required. The measure of occupancy of a cell can be interpreted as the probability that the cell is occupied. A question addressed herein is how to arrange the occupancies of the cells in the evidence grid so as to match as well as possible the measurements corresponding to the sensed environment.

An approach includes asking the related question: given an evidence grid, with probabilities of occupancy assumed for each cell, what is the probability that a (model) sensor measurement of the evidence grid matches the real-time sensor measurement? If we can make that calculation as a function of the occupancies of the cells, then we can turn the problem of how to fill out the occupancies of the cells in the evidence grid into a related optimization problem, to find the occupancies of the cells that maximize the probability that (modeled) measurements of the evidence grid match the (actual) measurements of the real world.

$p_{11}$ is the probability that a volume in space represented by an occupied evidence grid cell reflects a sensor beam, and can, but need not, make the assumption that this probability is independent both of the distance from the sensor device 26 (up to the maximum range of the sensor device 26), and of the angle from the central axis of the sensor device 26 (up to the angular width of the beam).

Similarly, $p_{00}$ is the probability that a volume in space represented by an unoccupied cell does not reflect the sensor beam. From these, the probability that a volume in space represented by an unoccupied cell reflects the sensor beam (a false positive response from the sensor) as $p_{10}=1-p_{00}$ is obtained, and also the probability that a volume in space represented by an occupied cell does not reflect the beam (a false negative response) as $p_{01}=1-p_{11}$.

The probability that a theoretical sensor measurement of an evidence grid is the same as a measurement of the actual sensed environment can be calculated as follows:

First, the probability that a single cell makes a reflection is considered. Letting $\rho_i$ be the probability that the ith cell in the evidence grid is occupied, then the probability that the ith cell produces a reflection is:

$$p_i = p_{11}\rho_i + p_{10}(1-\rho_i) \quad (1)$$

and the probability that the ith cell does not produce a reflection is:

$$\pi_i = 1 - p_i = p_{01}\rho_i + p_{00}(1-\rho_i) \quad (2)$$

For each range bin up to but not including the range bin within which an object is detected, the probability that there is no return is simply the probability that each of the cells in that range bin does not reflect the beam, which may be expressed as $\Pi_{i,i}$. For the range bin in which there was a detection, the probability that there is a reflection given the state of the evidence grid is obtained by calculating the probability that there was no detection and subtracting from 1, or $1-\Pi_{i,i}$. This simply states that in order for the sensor to detect a reflection, at least one of the cells must have reflected the beam. These probability calculations can be done in this manner for the real-time sensor measurements as well as for the virtual sensor measurements which represent the a priori data. The net result for the probability that a single theoretical sensor measurement of the evidence grid matches the actual radar measurement of the sensed environment is thus $$P_k = \Pi_{ik\,ik}[1-\Pi_{jk\,jk}] \quad (3)$$

where the subscript ik runs in the kth sensor beam over all of the cells lying in the range bin(s) closer to the sensor device 26 than the range bin in which there was an object detection, and the subscript jk runs in the kth radar beam over all of the cells lying in the range bin in which there was an object detection. Then, the processing device 24 can calculate the probability that all of the theoretical sensor measurements made on the evidence grid matches the actual measurements made by multiple beams including both the real-time sensor data transmitted by the sensor device 26 and the virtual sensor data representation of the a priori data as $$\beta = \Pi_k P_k \quad (4)$$

The goal is to find the occupancies $\rho_i$ which maximize $\beta$. In so doing, the most likely occupancies are found, given both the measurements of the real-time sensor and the virtual measurements representing the a priori data.

The product in Eq. (4) can be rearranged so that it is more transparent. In particular, we can examine the dependence of β on the occupancy of a single cell:

$$\beta = \{\Pi_k \, \Pi_{k'}[1-\Pi_{j'k,j'k'}]\} \cdot [\text{terms independent of } \rho_i] = P(\rho_i) \cdot [\text{terms independent of } \rho_i] \quad (5)$$

where the product k is over the sensor beams for which the ith cell is in the beam but from which there is no return in the corresponding range bin, and the product over k' is over the sensor beams for which the ith cell is in the range bin for which there was a detection. This expression splits the dependence on $\rho_i$ into two parts. The first part is a measure of how often the cell is not seen by a sensor beam. The second part is a measure of how well the current evidence grid supports the actual measured returns.

A few observations about the result in Eq. (5) follow. First, if a cell never appears in a detected range bin, then the second product in Eq. (5) (over k') is empty and the occupancy of the cell can be set to zero. In other words, if the cell is never in a detection range bin of any sensor beam, then its occupancy can be set to zero. Second, if the first product in Eq. (5) is empty, then the cell has never been in a sensor range bin with no detection. In this case, $\rho_i$ can be set to 1.

To solve for the optimum occupancies for those cells which cannot be trivially set to 0 or 1, one may examine more closely the quantity inside the braces in Eq. (5), $P(\rho_i)$. An embodiment seeks the maximum of β with respect to the $\rho_i$, subject to the constraint that $0 \leq \rho_i \leq 1$ (since $\rho_i$ is a probability of occupancy).

The maximum of β is experienced when one of the following conditions is met for each cell (note that this optimization is a constrained optimization, since $0 \leq \rho_i \leq 1$):

$$\partial P(\rho_i)/\partial \rho_i = 0, \, 0 < \rho_i < 1$$

$$\partial P(\rho_i)/\partial \rho_i < 0, \, \rho_i = 1$$

$$\partial P(\rho_i)/\partial \rho_i < 0, \, \rho_i = 0 \quad (6)$$

Solving these equations for the optimum point may be done in a conventional manner, such as using, for example, a steepest-descent method. Each of the calculations discussed above herein may be performed completely or partially by the processing device 24.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method performed by a processing device located in a vehicle, the method comprising:
   a. receiving a first data set from at least a radar device corresponding to a first detection signal transmitted over a first spatial region based on initial location and attitude information of the radar device;
   b. determining a match probability between the first data set and previously stored a priori terrain and obstacle data based on the location and attitude information of the radar device and associated with the received first data set;
   c. if at least one of the determined match probability is not greater than a predefined match probability threshold or a predefined threshold number of match probability determinations has not been met, adjusting at least one of the location or attitude information of the radar device and returning to b. based on the adjusted location or attitude information;
   d. if at least one of the determined match probability is greater than a predefined match probability threshold or a predefined threshold number of match probability determinations has been met, saving the adjusted location or attitude information or the initial location and attitude information if no adjustment occurred;
   e. calculating the most likely occupancy values to cells in an evidence grid based on the first data set, the stored location and attitude information, and a second data set formed by representing the a priori terrain data as the output of a virtual sensor; and
   f. generating an output based on the most likely occupancy values.

2. The method of claim 1, wherein the evidence grid is three-dimensional.

3. The method of claim 1, wherein determining the match probability comprises calculating the probability that a first sub-region represented by a first cell reflects at least one detection signal of a plurality of detection signals.

4. The method of claim 3, wherein determining the match probability further comprises calculating the probability that the first sub-region represented by the first cell does not reflect at least one detection signal of the plurality of detection signals.

5. The method of claim 4, wherein determining the match probability further comprises calculating a first probability that each sub-region within a first bin of the first spatial region does not reflect at least one detection signal of the plurality of detection signals and a second probability that each sub-region within a first bin of a second spatial region does not reflect at least one detection signal of the plurality of detection signals.

6. The method of claim 5, wherein determining the match probability further comprises calculating a third probability that each sub-region within a second bin of the first spatial region reflects at least one detection signal of the plurality of detection signals and a fourth probability that each sub-region within a second bin of the second spatial region does not reflect at least one detection signal of the plurality of detection signals.

7. The method of claim 6, wherein determining the match probability further comprises:
   calculating a first product of the first probability and the third probability; and
   calculating a second product of the second probability and the fourth probability.

8. The method of claim 7, wherein determining the match probability further comprises calculating a third product of the first and second products.

9. The method of claim 8, wherein determining the match probability further comprises calculating the maximum of the third product.

10. A vehicle comprising:
    a radar sensor configured to generate a first data set corresponding to a first detection signal transmitted over a first spatial region;
    memory configured to store a priori terrain and obstacle data;
    a positioning system configured to determine location and attitude information of the vehicle;
    a processing device coupled to the sensor, the processing device configured to:

determine a match probability between the first data set and previously stored a priori terrain and obstacle data based on initial location and attitude information of the vehicle associated with the received first data set;

adjust at least one of the location or attitude information of the vehicle and determine the match probability based on the adjusted location or attitude information, if at least one of the determined match probability is not greater than a predefined match probability threshold or a predefined threshold number of match probability determinations has not been met;

save the adjusted location or attitude information or the initial location and attitude information if no adjustment occurred, if at least one of the determined match probability is greater than a predefined match probability threshold or a predefined threshold number of match probability determinations has been met;

calculate the most likely occupancy values to cells in an evidence grid based on the first data set, the stored location and attitude information, and a second data set formed by representing the a priori terrain data as the output of a virtual sensor; and generate an output based on the most likely occupancy values; and an output device configured to output the generated output.

11. The vehicle of claim 10, wherein the evidence grid is three-dimensional.

12. The vehicle of claim 10, wherein the processing device determines the match probability by at least calculating the probability that a first sub-region represented by a first cell reflects at least one detection signal of a plurality of detection signals.

13. The vehicle of claim 12, wherein the processing device determines the match probability by at least further calculating the probability that the first sub-region represented by the first cell does not reflect at least one detection signal of the plurality of detection signals.

14. The vehicle of claim 13, wherein the processing device determines the match probability by at least further calculating a first probability that each sub-region within a first bin of the first spatial region does not reflect at least one detection signal of the plurality of detection signals and a second probability that each sub-region within a first bin of the second spatial region does not reflect at least one detection signal of the plurality of detection signals.

15. The vehicle of claim 14, wherein the processing device determines the match probability by at least further calculating a third probability that each sub-region within a second bin of the first spatial region reflects at least one detection signal of the plurality of detection signals and a fourth probability that each sub-region within a second bin of the a second spatial region does not reflect at least one detection signal of the plurality of detection signals.

16. The vehicle of claim 15, the processing determines the match probability by at least further:

calculating a first product of the first probability and the third probability; and calculating a second product of the second probability and the fourth probability.

17. The vehicle of claim 16, wherein the processing device determines the match probability by at least further calculating a third product of the first and second products.

18. The vehicle of claim 17, wherein the processing device determines the match probability by at least further calculating the maximum of the third product.

19. A system located in a vehicle, the system comprising:

a means for receiving a first data set corresponding to a first radar detection signal transmitted over a first spatial region;

a means for storing a priori terrain and obstacle data;

a means for determining location and attitude information of the vehicle;

a means for:

determining a match probability between the first data set and previously stored a priori terrain and obstacle data based on initial location and attitude information of the vehicle associated with the received first data set;

adjusting at least one of the location or attitude information of the vehicle and determine the match probability based on the adjusted location or attitude information, if at least one of the determined match probability is not greater than a predefined match probability threshold or a predefined threshold number of match probability determinations has not been met;

saving the adjusted location or attitude information or the initial location and attitude information if no adjustment occurred, if at least one of the determined match probability is greater than a predefined match probability threshold or a predefined threshold number of match probability determinations has been met;

calculating the most likely occupancy values to cells in an evidence grid based on the first data set, the stored location and attitude information, and a second data set formed by representing the a priori terrain data as the output of a virtual sensor; and generating an output based on the most likely occupancy values; and a means for outputting the generated output.

* * * * *

UNITED STATES PATENT AND TRADEMARK OFFICE
CERTIFICATE OF CORRECTION

PATENT NO.        : 8,868,344 B2                                     Page 1 of 1
APPLICATION NO.   : 13/240957
DATED             : October 21, 2014
INVENTOR(S)       : John B. McKitterick It is certified that error appears in the above-identified patent and that said Letters Patent is hereby corrected as shown below:

In the Specification

Col. 2, Line 37: "the attitude generated by", should read --the attitude (generated by--

Signed and Sealed this
Twelfth Day of May, 2015

Michelle K. Lee
*Director of the United States Patent and Trademark Office*